United States Patent [19]

Shadday et al.

[11] 4,425,879
[45] Jan. 17, 1984

[54] INTERNAL COMBUSTION ENGINE FAN DRIVE

[75] Inventors: Michael C. Shadday, Edinburg; Dennis A. Wilber, Elizabethtown, both of Ind.

[73] Assignee: Cummins Engine Company, Inc., Columbus, Ind.

[21] Appl. No.: 262,614

[22] Filed: May 11, 1981

Related U.S. Application Data

[63] Continuation of Ser. No. 931,436, Aug. 7, 1978, abandoned.

[51] Int. Cl.³ .................... F01P 11/10; F16D 33/12
[52] U.S. Cl. ............................. 123/41.12; 192/82 T; 192/85 AA; 192/106 F; 416/169 A
[58] Field of Search ............... 123/41.12, 41.46, 41.49; 416/169 A; 137/56; 91/222, 422, 442; 192/85 A, 85 AA, 104 F, 106 F, 82 T

[56] References Cited

U.S. PATENT DOCUMENTS

| | | | |
|---|---|---|---|
| 2,927,563 | 3/1960 | Geiger | 192/82 T |
| 2,954,040 | 9/1960 | Bolster | 192/106 F |
| 3,576,241 | 4/1971 | Maurice | 192/85 A |
| 3,804,219 | 4/1974 | Cummings | 192/82 T |
| 4,074,663 | 2/1978 | Cory | 123/41.12 |

FOREIGN PATENT DOCUMENTS

| | | | |
|---|---|---|---|
| 2809847 | 9/1978 | Fed. Rep. of Germany | 123/41.12 |
| 793146 | 4/1958 | United Kingdom | 192/82 T |

Primary Examiner—Craig R. Feinberg
Assistant Examiner—W. R. Wolfe
Attorney, Agent, or Firm—Merriam, Marshall & Bicknell

[57] ABSTRACT

This disclosure deals with a drive for a fan of an internal combustion engine, the drive including a clutch connected between the engine and the fan blades. A piston is movable to actuate the clutch, and an actuating fluid is employed to move the piston. The fan drive is connected to the engine lubricating system so that the engine lubricant acts as the actuating fluid. An engine temperature responsive circuit actuates the clutch to engage and disengage at certain engine temperatures. The fan drive includes a fluid feed path, return path and control path, but only two fluid connections to the clutch are necessary. When the temperature responsive circuit operates to disengage the clutch, a valve releases the pressure in order to quickly disengage the clutch.

14 Claims, 4 Drawing Figures

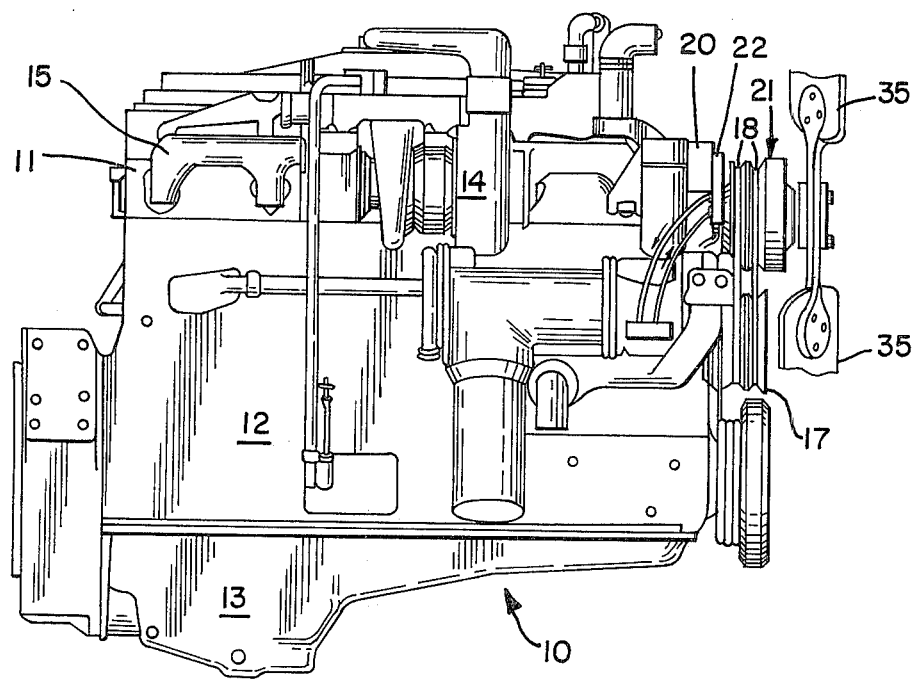
FIG_1_
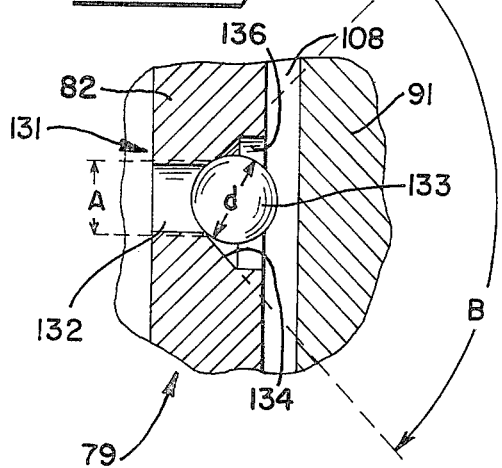
FIG_3_
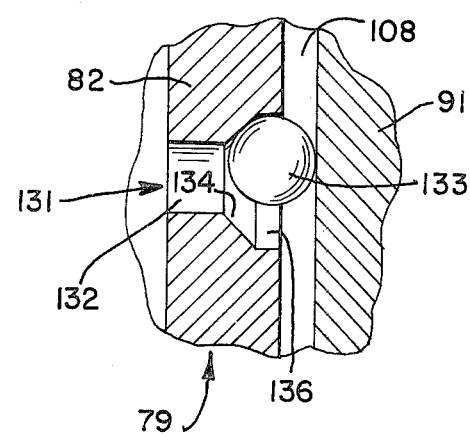
FIG_4_

INTERNAL COMBUSTION ENGINE FAN DRIVE

This is a continuation of application Ser. No. 931,436, filed Aug. 7, 1978, now abandoned.

An internal combustion engine, such as a diesel engine, normally includes a cooling fan which is driven by the engine and moves air through the engine radiator and across the engine. The purpose, of course, is to prevent the engine and the accessory parts from overheating. In the past, such a fan has been connected to be continuously driven regardless of the engine temperature or speed, but in more recent years, fan drives including clutches have been developed for driving the fan only under certain conditions. For example, the fan would not have to be driven on a cold day or when the vehicle is moving fast because cooling would not be necessary or desirable. The purpose of such a fan drive is to turn the fan only when cooling is required, and thereby to conserve engine fuel and to make more power available to move the vehicle when fan cooling is not needed. Still another purpose is to reduce fan noise by disengaging the clutch whenever possible.

A number of fan drive designs have been developed to fulfill this function. The Geiger U.S. Pat. No. 2,927,563 discloses a system wherein the engine lubricant is utilized as the actuating fluid, the system including an engine coolant temperature sensor for operating the clutch. U.S. Pat. No. 3,804,219 and Borg Warner Corporation Brochure Form 2262-7 R 5M2/76 disclose a drive wherein compressed air is employed to actuate the clutch. U.S. patent application Ser. No. 775,037, now abandoned, discloses a drive wherein engine lubricant pressure is utilized to operate the clutch.

A disadvantage of drives of the foregoing character is that they have required three or more fluid connections to the drive. In the case of an air pressure actuated system, air lines must be connected and hydraulic lines must be provided to circulate a lubricant through the drive. In the case of an engine lubricant pressure actuated clutch, a control line and two lubricant circulating lines have been provided.

Another disadvantage lies in the operation of at least some of the foregoing systems. Pressure is applied to actuate the clutch by opening a valve, and the pressure is supposed to be released by closing the valve. However, when the valve is closed, the pressurized fluid is locked in the clutch and the pressure drops relatively slowly as the fluid leaks through the clutch parts. This relatively slow release of pressure may cause the clutch to operate in a partially engaged condition, resulting in excessive heating of the clutch plates and wear and/or glazing of the plates.

It is a general object of the present invention to provide an improved fan drive which avoids the foregoing problems. The drive utilizes the engine lubricant as the control and lubricating medium, and only two fluid connections to the drive are required. A pressure release vlave is provided which is operated from the lubricant pressure and from centrifugal force.

A fan drive in accordance with this invention comprises a clutch including a pressure chamber. The drive further includes a fluid feed or supply path, a fluid return path, and a fluid control path. The feed and return paths are connected in the engine lubricant system and lubricant flows continuously through these two paths during operation. An engine temperature responsive valve is provided to intermittently divert lubricant from the feed path to the control path; thus, only two lubricant connections to the drive are required. The drive further includes a pressure release valve in the pressure chamber, for rapidly reducing the lubricant pressure when the temperature responsive valve is closed.

The foregoing and other objects and advantages of the present invention will become more apparent from the following detailed description taken in conjunction with the accompanying figures of the drawings, wherein:

FIG. 1 is a side elevational view of an internal combustion engine including a fan drivein accordance with the present invention;

FIG. 3 is a fragmentary enlarged view of a valve of the fan drive; and

FIG. 4 is a view similar to FIG. 3 but showing different positions of the parts.

Figure 2:
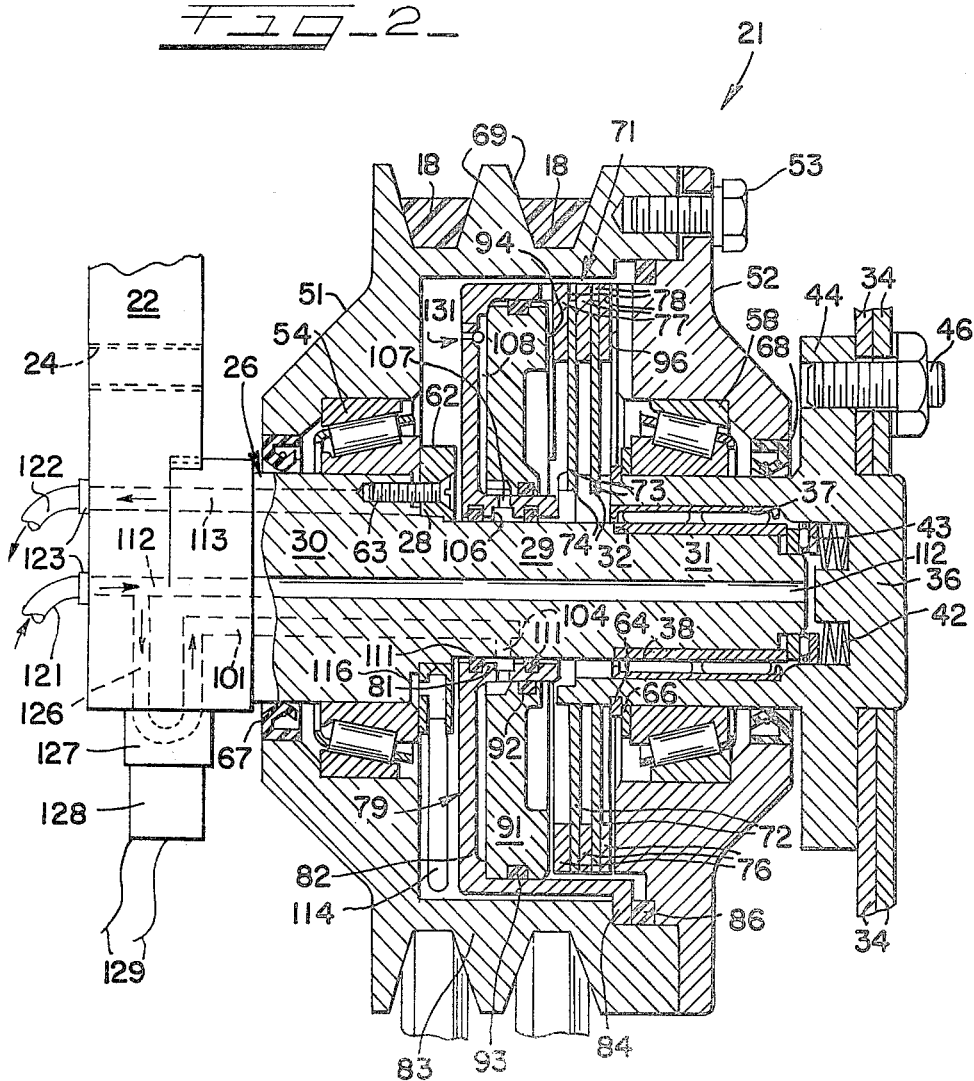
FIG. 2 is an enlarged sectional view of the fan drive shown in FIG. 1.

With reference to FIG. 1, the reference numeral 10 indicates an engine which may be conventionally constructed with the exception of the fan drive and the associated control connections. The engine 10 includes a head 11, a block 12, an oil pan 13, a turbocharger 14 and a manifold 15. A sheave 17 is connected to be driven by the crankshaft of the engine 10 through an accessory gear train (not shown) and is employed to drive accessories of the engine including a fan drive 21 (FIGS. 1 and 2) in accordance with the present invention.

The drive 21 is supported by a mounting bracket 22 on the front end of the engine 10. A plurality of threaded holes 24 are formed through the bracket 22 for the purpose of fastening the bracket 22 to a member 20 of the engine using bolts, for example. On the mounting bracket 22 is rigidly secured a stationary mounting shaft 26 which extends forwardly from the bracket 22. The shaft 26 is cylindrical, and the central portion 29 of the shaft, starting at a ledge indicated by the numeral 28, has a reduced diameter. Further, the forward one-third portion 31 of the shaft 26 is still further reduced in diameter starting at another ledge 32. The rearward one third portion of the shaft is indicated by the numeral 30.

A hub 36 is rotatably mounted on the forward one-third portion 31 of the shaft 26 and supports fan blades 35 and blade carriers 34. The hub 36 includes an internal bore 37 which fits over the portion 31 of the shaft 26, and a needle bearing 38 rotatably mounts the hub 36 on the shaft 26. Between the forward end surface of the shaft 26 and the central part of the hub 36 are mounted a number of annular Belleville springs 42 and a roller thrust bearing 43. The thrust bearing 43 absorbs the thrust load between the hub 36 and the shaft 26, and the Belleville springs 42 preload the bearings. The fan blades 35 and carriers 34 are secured to a radially extending flange 44 of the hub 36, bolts 46 being employed to secure the carriers 34 to the hub 36.

The fan drive 21 further includes a housing including a sheave part 51 and a cover part 52 which are secured together by a plurality of angularly spaced bolts 53. The sheave part 51 is rotatably mounted on the rearward portion 30 of the shaft 26 by a rear roller bearing 54, and the cover part 52 is rotatably mounted on the outer surface of the hub 36 by a forward roller bearing 58. As shown in FIG. 2, the two bearings 54 and 58 are angled such that the bearing 54 prevents forward movement of the sheave part 51 and the bearing 58 prevents rearward movement of the cover part 52. The inner race of the rear roller bearing 54 is prevented from moving forwardly by a retainer ring 62 that is attached by screws 63 to the shaft 26 at the ledge 28, just forwardly of the bearing 54. The inner race of the forward bearing 58 is prevented from moving rearwardly by a retainer ring 64 that is fastened in an annular groove formed in the outer periphery of the hub 36, and by a retaining washer 66 that is located between the bearing 58 and the ring 64. A rear rotating shaft seal 67 is mounted between the outer surface of the rearward portion 30 of the shaft 26 and the inner periphery of the sheave part 51 immediately to the rear of the bearing 54, and another rotating shaft seal 68 is mounted between the outer periphery of the hub 36 and the inner periphery of the cover part 52 just forwardly of the bearing 58.

It will be apparent from the foregoing that the housing is rotatable, due to the bearings 54 and 58, with respect to the shaft 26 and with respect to the hub 36. Further, the shaft seals 67 and 68 prevent leakage of fluid from the interior of the housing. A pair of annular V-belt receiving grooves 69 are formed in the outer periphery of the sheave part 51, the grooves receiving the two belts 18. Consequently, when the engine is operating, the belts 18 rotate or drive the sheave part 51 and the cover part 52.

Since the hub 36 is rotatable both with respect to the shaft 26 and the housing parts 51 and 52, the hub will not turn unless a clutch mechanism, indicated generally by the reference numeral 71, is engaged. The clutch mechanism 71 is mounted in the enclosure formed by the housing parts 51 and 52, and includes two or more radial discs 72 which have inwardly extending tangs 73 formed on their inner periphery. The tangs 73 are located in angularly spaced slots 74 formed in the outer surface of the hub 36, so that the discs 72 rotate with the hub 36. The clutch mechanism 71 further includes three or more annular plates 76 which are interleaved with the discs 72. The plates 76 have a plurality of radially outwardly extending tangs 77 which are received in axially extending slots 78 formed in a piston housing 79. The piston housing 79 includes a tubular hub 81 which is rotatably mounted on the central part 29 of the shaft 26, a radially extending rear wall portion 82 which extends from the hub portion 81 radially outwardly to closely adjacent the outer wall of the sheave part 51, a tubular outer wall portion 83 which encloses the plates 76 and the discs 72 and which has the axial slots 78 formed therein, and a radially outwardly extending flange 84 which is clamped between adjoining surfaces of the sheave part 51 and the cover part 52. A ring 86 is also located between the flange 84 and the cover part 52 to connect the piston housing 79 to the housing parts 51 and 52. Since the flange 84 is clamped to the housing, it will be apparent that when the housing is rotated by the belts 18, the piston housing 79 and the plates 76 will also be rotated.

An axially movable piston 91 is also provided which serves to actuate the clutch 71. The piston 91 is rotatably mounted on the outer surface of the hub 81 of the piston housing 79, and a seal 92 is provided between the piston 91 and the hub 81. The piston 91 extends radially outwardly from the hub 81 to closely adjacent the inner periphery of the outer wall portion 83 of the piston housing 79, and another seal 93 is provided between the piston 91 and the outer wall portion 83. A radially extending pressure surface 94 is formed on the forward side of the piston 91 adjacent the plates 76. Thus, if the piston 91 were moved forwardly, the plates 76 and the discs 72 would be pressed together between the surface 94 and a radially extending surface 96 of the cover part 52.

The pressure of the lubricant of the lubricating system of the engine is employed to actuate the clutch. An axially extending control passage 101 is formed in the shaft 26, which extends axially forwardly to a location which is radially aligned with the hub 81 of the piston housing 79. A radial passage 104 extends from the axial passage 101 to the outer periphery of the shaft 26, and an annular groove 106 formed in the inner periphery of the hub 81 connects with the passage 104. A plurality of radially extending passages 107 are formed through the hub 81 and connect the groove 106 with a pressure chamber 108 formed between the forward side of the piston housing 79 and the rear side of the piston 91. The chamber 108 is closed at the inner and outer ends by the two seals 92 and 93. It will be apparent that when the passages 101 and 104, the groove 106 and the chamber 108 are filled with a lubricant under pressure, the pressure of the lubricant will force the piston 91 and the rear wall portion 82 of the piston housing 79 apart. Since the piston housing 79 cannot move axially due to the flange being clamped, the piston 91 will move forwardly, and the plates 76 and the dics 72 will be pressed together between the surfaces 94 and 96. Two additional seals 111 are provided between the hub 81 of the piston housing 79 and the shaft 26, on opposite sides of the groove 106, in order to prevent loss of pressure in the chamber 108.

In addition to the control passage 101, fluid passages are also provided in the shaft 26 to carry the lubricant to the bearings and to the clutch 71 in order to cool and lubricate them. An axially extending feed passage 112 is formed through the length of the shaft 26, and another axially extending return passage 113 is formed from the ledge 28 to the rearward end. The clamping ring 62 has a passage 116 formed therein to permit return flow to the passage 113 from the interior of the housing. A curved tube scavenger pump 114 is connected to the passage 116, which will pump the lubricant from the interior of the housing to the passage 113.

The drive is connected to the lubricant system of the engine by two lengths of hose or tube 121 and 122. The hose 121 is preferably connected in the system adjacent the pressure or outlet side of the engine driven lubricant pump (not shown), and the hose 122 is connected to a return line leading to the lubricant reservoir. Couplings or fittings 123 secure the hose 121 and 122 to the bracket 22. The hose 121 connects with the feed passage 112 and the hose 122 connects with the return passage 113. Thus, engine lubricant will continuously flow, when the engine and the pump are operating, into the passage 112, through the bearings and around the clutch plates, and out of the passage 113.

The control passage 101 is connected to a branch passage 126 which extends from the control passage 101, through a valve 127 and to the rearward end of the feed passage 112. The valve 127 is mounted on the bracket 22, and an electrical solenoid 128 is fastened to and operates the valve 127. Electrical leads 129 connect the solenoid 128 with a control circuit (not shown). The control circuit does not form part of this invention, and may, for example, comprise a thermostatic switch connected in series with a power supply and the solenoid 128. The switch may be connected to sense the engine temperature and be closed at or above a given temperature, and thereby energize the solenoid 128 and open the valve 127.

When the valve 127 is closed, pressure communication between the feed passage 112 and the control passage 101 is blocked, and the lubricant flows only through the feed passage 112, the lubricating and cooling paths in the fan drive, and the return passage 113. When the valve 127 is open, the lubricant flows through the above-mentioned lubricating and cooling paths, and the full lubricant pressure also appears in the branch passage 126 and in the control passage 101.

When the engine 10 is operating and the belts 18 are turning the sheave part 51 and the cover part 52, if the valve 127 is closed, the pressure in the chamber 108 is low and the piston 91 floats in the piston housing 79 and does not force the plates 76 and the discs 72 together. When the engine temperature rises to above a predetermined level, the valve 127 is opened and the lubricant pressure in the chamber 108 will force the piston 91 forwardly or toward the right as seen in FIG. 2, and the discs 72 and the plates 76 will be compressed between the surfaces 94 and 96. In these circumstances, the discs and the plates will be essentially locked together and there will be substantially a direct drive connection between the sheave part 51 and the hub 36.

The clutch of the fan drive further includes a pressure release valve 131 for reducing the pressure in the chamber 108 relatively rapidly after the valve 127 has been closed. While the valve 131 may be formed in either the piston 91 or in the piston housing 79, it is preferably formed in the radial rear wall 82 of the housing 79. The valve 131 includes a passage 132 (FIGS. 3 and 4) formed through the rear wall 82 of the piston housing 79, adjacent the outer wall 83. The passage 132 has a circular cross section and its centerline extends parallel to the axis of rotation of the piston housing 79. A free or unrestrained ball 133 is positioned in the forward end of the passage 132, and the diameter of the ball 133 is greater than the diameter of the passage 132. The forward end of the passage 132 has a tapered seat 134 for the ball, and an axially extending counter bore 136. The diameter of the counter bore 136 is substantially greater than that of the passage 132, and the tapered seat 134 extends between the passage 132 and the counter bore 136. As shown in FIGS. 3 and 4, the diameter of the counter bore 136 is substantially larger than the ball 133 so that the ball is free to move radially in the counter bore. When the ball 133 is seated on the forward edge of the passage 132 (FIG. 3), the forward side of the ball is spaced from the piston 91, but it is possible for the ball to roll radially and forwardly on the tapered seat to the FIG. 4 position where it engages the piston 91 which holds the ball 133 in the counter bore. In the FIG. 4 position, the ball uncovers the passage 132 but it is still closely adjacent the forward end of the passage 132.

Assume that the belts 18 are turning the parts 51 and 52, the piston 91 and the piston housing 79. If the valve 127 is closed and there is no lubricant in the chamber 108 adjacent the valve 131, the centrifugal force acting on the ball 133 will move the ball outwardly to the FIG. 4 position where it is restrained by the piston 91. When the valve 127 is opened, the lubricant under pressure flows rapidly into the chamber 108 and starts to flow out of the chamber 108 through the passage 132. The flow rate of the lubricant out of the chamber 108 and through the passage 132 quickly increases until the differential pressure across the ball 133 is sufficient to overcome the centrifugal force and move the ball 133 against the seat (FIG. 3). The differential force mentioned above arises from the pressure drop across the restricted flow passage formed between the ball 133 and the seat 134 when the ball is in the FIG. 4 position. As soon as the ball 133 seats and blocks the passage 132, the pressure builds up in the chamber 108 and engages the clutch, and the lubricant pressure holds the ball on the seat.

When the valve 127 is subsequently closed, the lubricant in the chamber 108 is momentarily trapped. This lubricant turns with the parts 79 and 91 and the centrifugal force exerted by the lubricant on the piston 91 momentarily holds the piston against the clutch plates and keeps the clutch engaged. There is however slight leakage of the lubricant out of the chamber 108 through the seals 92, 93 and 111, and the lubricant pressure in the chamber 108 drops slightly. There are two forces acting on the ball 133, the centrifugal force which operates to move the ball radially outwardly to the FIG. 4 position, and the lubricant force which operates to hold the ball seated. When the lubricant pressure drops, the lubricant force falls below the centrifugal force, and the ball then moves to the FIG. 4 position. The lubricant then flows through the passage 132 and into the chamber which contains the pump 114, and the resulting pressure drop in the chamber 108 quickly disengages the clutch. The lubricant flowing out of the chamber 108 is replaced by air which moves relatively easily through the seals.

It will be apparent that a new and useful fan drive has been provided. While the fan drive includes feed and return paths through which the lubricant continuously flows, and also a clutch control path through which lubricant intermittently flows, only two fluid connections to the drive are necessary. The pressure release valve 131 produces a rapid drop in lubricant pressure and disengagement of the clutch. The valve 131 is very simple in construction and operation, and it operates automatically without any controls required.

The functioning of the valve 131 is dependent on a number of factors including drive speed, the ball size and weight. Those skilled in the art may design the valve, taking the critical factors into account, to obtain the operating characteristics desired. The following is an equation setting out the forces acting on the ball 113:

$$P_E = \frac{F_1 - F_2}{A \cos \beta/2} \tag{1}$$

$$F_1 = 28.38 \, W_2 \, R_s \, \frac{(RPM)^2}{(1000)} \sin \beta/2 \tag{2}$$

$$F_2 = .4333 \, \frac{(RPM)^2}{(1000)} (R_s - R_f) A \cos \beta/2 \tag{3}$$

$$A = \pi (d/2 \cos \beta/2)^2 \tag{4}$$

$$W_2 = 4/3\pi (d/2)^3 (D_B) - 4/3\pi (d/2)^3 (D_f) \tag{5}$$

where $P_E$ is the lubricant pressure required to seat the ball 133.

$R_f$ is the radius from the axis of rotation of the shaft 26 to the center of the feed opening 107.

$R_s$ is the radius from the axis of rotation of the shaft 26 to the centerline of the valve passage 132.

$\beta$ is the angle of the tapered seat 134 (see FIG. 3).

RPM is the rotatonal speed of the shaft 26.

A is the area of the ball 133 within the line of contact with the seat (FIG. 3).

d is the diameter of the ball 133.

$W_2$ is the effective weight of the ball 133 when in the lubricant.

$D_B$ is the density of the ball material.

$D_f$ is the density of the lubricant.

What is claimed is:

1. A fan drive for an internal combustion engine including a fan and an engine drive, said fan drive comprising a clutch which when engaged couples said engine drive to said fan and when disengaged uncouples said engine drive from said fan, said clutch including at least two parts forming a pressure chamber, at least one of said two parts being rotatable, feed and return liquid passage means connected to said chamber and adapted to be connected to a source of liquid under pressure, first valve means connected in said feed passage means for controlling the communication of liquid pressure between the source and said pressure chamber, said first valve means having an open position where said pressure chamber receives substantially the full pressure of said source and a closed position where said passage means is closed and pressure is locked in said chamber, and second valve means on said rotatable part for releasing pressure in said chamber to said return passage after said first valve means is moved to said closed position, said clutch being actuated when said first valve means is open and liquid pressure appears in said chamber, said second valve means including a member that responds to centrifugal force and to liquid pressure and having a closed position and an open position, and said pressure chamber being bounded by seals which enable leakage of liquid under pressure from said chamber when said first valve and said second valve are in said closed positions, and said seals leaking said liquid under pressure when said first valve is closed and thereby causing said second valve to open and said clutch to slowly disengage.

2. A fan drive according to claim 1, wherein said second valve means comprises a passage formed through said rotatable part, said passage having one end thereof communicating with said chamber and said one end having a tapered surface forming a valve seat, said second valve means further including a movable ball which is engageable with said valve seat and rotates with said rotatable part.

3. A fan drive according to claim 2, wherein said two parts are both rotatable and said ball is between said two parts.

4. A fan drive according to claim 2, wherein said two parts are spaced a distance apart which is less than the diameter of said ball, whereby said ball is prevented from moving out of said tapered end of said passage.

5. A fan drive for an internal combustion engine including an engine drive, a fan, and an engine lubricating system including a pump having a high pressure outlet and a low pressure return, said fan drive comprising a non rotatable mounting shaft adapted to be secured to the engine, a fan hub rotatably mounted on said shaft, housing means rotatably mounted on said shaft and on said hub, said housing means including drive means adapted to be connected to be rotatably driven by the engine, clutch means including first clutch parts attached to said housing means and second clutch parts attached to said hub, said first and second clutch parts being relatively movable between engaged and disengaged positions, said clutch means further including a clutch piston mounted within said housing means adjacent said clutch parts, said housing means and said piston forming a pressure chamber therebetween, said chamber being bounded by seals which enable leakage of lubricant from said chamber, a control passage formed in shaft and connected to said chamber and adapted to be connected to said outlet, a control valve connected to said control passage to control the flow of lubricant to said passage and to said chamber, said control valve having an open position where it enables the flow of lubricant to said chamber and a closed position where it blocks the flow of lubricant to and from said chamber, lubricant pressure in said chamber forcing said piston to engage said first and second clutch parts and engage said clutch means, and a pressure-speed responsive valve formed on one of said housing means and said piston, said pressure-speed responsive valve being connected between said chamber and said return and being closed to lubricant flow at high pressure and being open to lubricant flow at reduced pressure, and said seals leaking said lubricant under pressure when said control valve is in said closed position and thereby reducing said pressure and causing said pressure-speed responsive valve to open and said clutch means to slowly disengage.

6. A fan drive as in claim 5, and further including bearings for rotatably mounting said hub and said housing means on said shaft, a feed passage formed in said shaft and adapted to be connected to said outlet, said feed passage being connected to supply lubricant to said bearings and to said first and second clutch parts.

7. A fan drive as in claim 5, wherein said control valve comprises a temperature responsive lubricant control valve adapted to respond to the temperature of the engine.

8. A fan drive as in claim 5, wherein said pressure-speed responsive valve comprises a member that responds to centrifugal force when it is rotated and to lubricant pressure within said chamber.

9. A fan drive for an internal combustion engine including an engine drive, a fan, and an engine lubricating system including a high pressure pump outlet and a low pressure pump return, said fan drive comprising clutch means between said engine drive and said fan, said clutch including a pressure chamber and said clutch when engaged coupling said engine drive to said fan and when disengaged uncoupling said engine drive from said fan, seals bounding said pressure chamber and enabling leakage of lubricant from said pressure chamber, said fan drive further including a feed path and a return path therethrough, means for connecting said feed and return paths respectively to said pump outlet and said pump return for continuously circulating lubricant through said feed path and said return path during engine operation, said fan drive further including a control path connected to said pressure chamber, first valve means connected in said control path and having an open position and a closed position, said first valve placing said pressure chamber in lubricant flow communication with the pump outlet when in said open position, and said first valve closing said control path to lubricant flow when in said closed position, and second valve means between said pressure chamber and said return path, said second valve being responsive to lubricant pressure in said pressure chamber and being closed to lubricant flow at high pressure and open to lubricant flow at reduced pressure, the lubricant pressure appearing in said pressure chamber when said first valve is open and the pressure closing said second valve and said seals leaking lubricant from said chamber when said first valve is closed and thereby causing said second valve to open.

10. A fan drive as in claim 9, wherein said first valve means comprises a temperature responsive solenoid operated fluid valve.

11. A fan drive as in claim 9, wherein said second valve means includes a member that responds to centrifugal force and to said pressure of the lubricant in the pressure chamber.

12. A fan drive as in claim 9, and further including mounting means for fastening said fan drive to the engine, first and second coupling means on said mounting means and connected respectively to said pump outlet and pump return and to said feed path and said return path, said feed path and said return path extending through said mounting means, and said control path extending into said mounting means and connecting with said feed path in said mounting means.

13. A fan drive as in claim 12, wherein said first valve comprises a temperature responsive valve fastened to said mounting means.

14. A fan drive as in claim 12, wherein said coupling means forms the only connections between said fan drive and said engine lubricating system.

* * * * *